United States Patent [19]

Kayser

[11] 4,190,075

[45] Feb. 26, 1980

[54] DOUBLE VALVE CONSTRUCTION

[75] Inventor: John P. Kayser, Madison, Wis.

[73] Assignee: Airco, Inc., Montvale, N.J.

[21] Appl. No.: 836,864

[22] Filed: Sep. 26, 1977

[51] Int. Cl.² ............................................ F16K 15/18
[52] U.S. Cl. ........................... 137/329.1; 137/614.21; 137/614.05
[58] Field of Search .............. 137/360, 614.19, 614.21, 137/329.1, 329.2, 329.3, 329.4, 614.06, 614.05; 251/149.6

[56] References Cited

U.S. PATENT DOCUMENTS

| Re. 28,334 | 2/1975 | Cranage | 251/149.6 |
| 2,905,487 | 9/1959 | Schifter | 137/630.22 |
| 3,563,267 | 2/1971 | Thompson | 137/329.1 |
| 3,931,829 | 1/1976 | McWhinnie, Jr. et al. | 137/329.1 |

Primary Examiner—Martin P. Schwadron
Assistant Examiner—A. Michael Chambers

Attorney, Agent, or Firm—Roger M. Rathbun; Edmund W. Bopp; Larry R. Cassett

[57] ABSTRACT

A double valve construction for gas or vacuum outlets which are operable by the insertion of an adapter to deliver gas or vacuum to an intended use including a secondary housing which is connected to the gas or vacuum and has a secondary valve. A primary housing is adapted to interfit with the secondary housing such that the secondary valve is opened but allowing the two housings to be adjustable for varying plaster thicknesses of the wall in which the outlet is mounted. The primary housing has a dust cap closing its delivery end. A primary valve is formed by the interrelationship of the primary housing into the secondary housing and normally prevents the gas or vacuum from reacting the primary housing. As an adapter is inserted into the primary housing, the dust cap is displaced a predetermined distance until it opens the primary valve allowing the gas or vacuum to enter the adapter.

5 Claims, 3 Drawing Figures

DOUBLE VALVE CONSTRUCTION

BACKGROUND OF THE INVENTION

It is normal in most hospitals today to provide in-room service of various medical gases such as oxygen, air, nitrous oxide, as well as a source of vacuum for suction equipment. The gases are generally provided, under pressure, at a central source, yet ready access is permitted throughout the hospital whenever needed. Central vacuum pumps similarly provide a source of vacuum whch is made available at utilization points in the hospital.

Service outlets are thus located at the point of ultimate use and are adapted to have an adapter "plugged in" to such outlets to cause the flow of gas, or vacuum, through the adapter to the end use. Most outlets are constructed to be operative as the adapter is inserted and to close-off automatically as the adapter is removed. One typical type of outlet is shown and described in U.S. Pat. No. 3,563,267 of Charles S. Thompson and which is of a double valve design having primary and secondary housings and corresponding valves.

The secondary housing is considered to be the roughing-in assembly and is installed in the hospital wall similar to electrical outlet boxes. The secondary housing is connected to the piping for the medical gas or vacuum and generally is provided with a check valve which is normally closed and which opens as the primary housing is inserted thereinto. Thus, the primary housing is removed for maintenance, etc. without leakage of gas or loss of vacuum.

The primary housing and secondary housing can be joined by a sliding seal to provide for differences in wall or plaster thickness.

In the U.S. Pat. No. 3,563,267 referred to, when the outlet is assembled with the primary housing engaged in the secondary housing, the secondary valve is open and the gas pressure, in particular, acts directly upon the primary valve which is located at the outermost point of the outlet and is immediately engageable by insertion of an adapter. Thus, the full line pressure of approximately 50 psi must be initially pushed against by an operator, such as a nurse, inserting the adapter. Some difficulties are thus experienced in the initial alignment and insertion of the adapter when immediately confronted with the force created by the line pressure.

BRIEF DESCRIPTION OF THE DRAWINGS

The invention may be best understood from the following detailed description of a preferred embodiment of the same, when considered with the annexed drawings wherein.

SUMMARY OF THE INVENTION

The present invention comprises a modification of that shown in U.S. Pat. No. 3,563,267 to aid in the ease of inserting an adapter into a gas wall outlet. The construction allows the adapter to be aligned and inserted into the wall outlet a certain distance before any pressure is experienced against such insertion.

In this invention, the secondary housing is provided with a valve which is normally closed when the primary housing is not in its operative position with the secondary housing. As the primary housing is inserted into the secondary housing, the secondary valve opens and thereafter remains open for so long as the primary housing is in the inserted position. There is a sliding seal between the primary and secondary housings so that they may be adjusted for different wall or plaster thicknesses.

The primary valve is not, however, at the point where the adaptor is inserted but instead is essentially formed when the primary and secondary housings interfit. The primary valve is then located at the inserted end of the primary housing and remains closed to prevent gas pressure from entering the primary housing, even when the outlet is fully assembled and operational.

A dust cap seals the other end of the primary housing and is maintained in the sealed position by a spring bias, however, the line pressure does not normally act against the dust cap.

As an adapter is inserted into the outlet by an operator, the adapter initially contacts the dust cap and displaces it further into the primary housing against the minimal spring bias. Thus, the operator experiences little pressure against the insertion of the adapter and its ease of alignment and entry is greatly facilitated.

It is only after the adapter has entered the body of the primary housing a certain distance, so that alignment is insured, that the dust cap engages the primary valve. Continued insertion of the adapter and corresponding displacement of the dust cap, therefore, opens the primary valve so that the gas may enter the primary housing and continue out through the adapter.

The present invention thus increases the ease of inserting an adapter into the gas outlet by allowing substantial insertion of the adapter into the primary housing before appreciable resistance to such insertion is experienced.

DESCRIPTION OF THE PREFERRED EMBODIMENT

Figure 1:
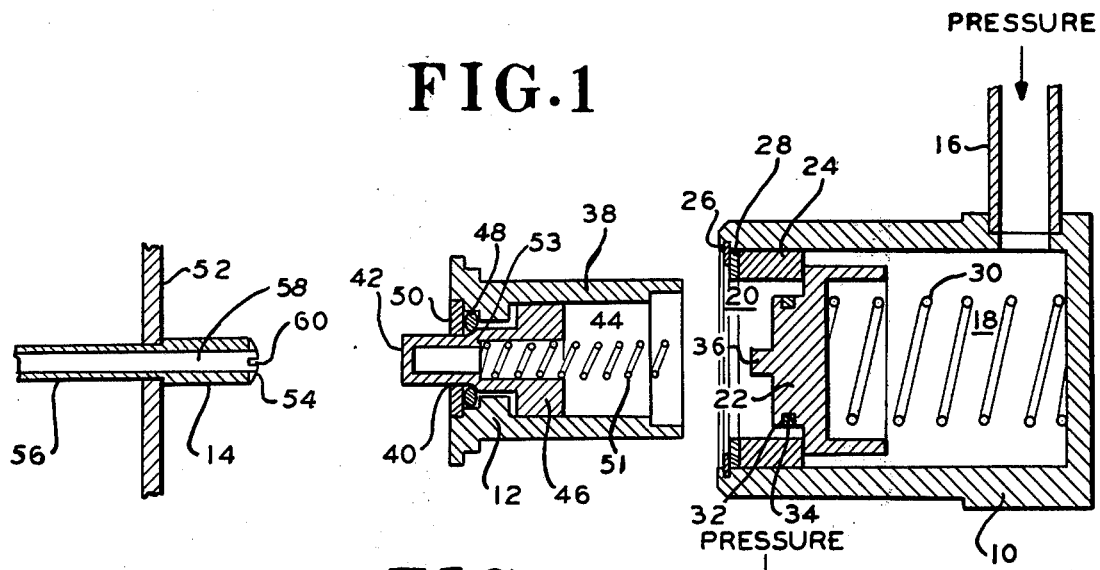
FIG. 1 is a cross-sectional view of the primary and secondary housings and the adapter prior to their interrelationship.

Referring now more particularly to the drawings, there is shown in FIG. 1 a secondary housing 10, a primary housing 12 and an adapter 14. The secondary housing 10 is shown connected to piping 16 which in turn, is supplied by the central source of gas or vacuum. The secondary housing itself is of generally closed cylindrical shape having an interior chamber 18 to which the gas or vacuum communicates via the piping 16.

A secondary valve 20 is located in the open, outward end of the secondary housing 10 and comprises a movable valve element 22 and a corresponding valve seat 24. The valve seat 24 is of a semi-flexible material, such as rubber, to insure a good seal against the valve element 22 and is held within the interior surface of secondary housing 10 by means of retainer ring 26 acting against washer 28 which surrounds the other surface of the valve seat 24.

The inside diameter of the valve seat 24 is of a dimension determined by the outside diameter of the primary housing 12 as will be later explained.

Movable valve element 22 is biased against its seat 24 by means such as spring 30 so that the secondary valve 20 is normally closed when the primary housing 12 is not interrelated with the secondary housing 10.

At the forward face of movable valve element 22, that is, the surface which engages the primary housing 12, there is a reduced diameter portion 32 and in that reduced diameter portion is positioned an O-ring 34 within a suitable annular groove. A projecting spring keeper 36 is formed on the same forward surface of movable valve element 22. The purpose and function of the O-ring 34 and the spring keeper 36 will be later explained.

The primary housing 12 comprises a cylindrical body 38 having one end open which is shown facing the secondary housing 10 and having, at the other end, an opening 40 with a dust plug 42 fitted therein to close off the opening 40. The open end of the cylindrical body 38 forms therein a primary housing chamber 44. The dust plug 42 slides within chamber 44 and is generally star-shaped at 46 to allow gas to freely pass thereby.

As shown in the FIG. 1, the dust plug 42 is in the closed position and seals against the interior of the cylindrical body 38 through an O-ring 48 preventing the admission of the dust or other contaminating particles into the primary housing chamber 44. The O-ring 48 may be conveniently retained by ring 50.

A spring 51 acts against an internal recess 53 within the dust plug 42 and, when the primary housing 12 is inserted within the secondary housing 10, the spring 51 is centered on spring keeper 36 on movable valve element 22 to exert a bias to normally retain the dust plug 42 in the closed position.

The adapter 14 has a flat flange 52 which, when inserted in the gas outlet, abuts the outside face of the primary housing 12. The adapter 14 includes a forward end 54 which is insertable into the gas outlet, and a use end 56 to which is connected the device which utilizes the gas or vacuum, with passageway 58 connecting therebetween. At the forward end 54, there are a series of serrations 60 to insure gas flow into passageway 58 even when the forward end 54 is abutted against a flat or slightly curved object.

Figure 2:
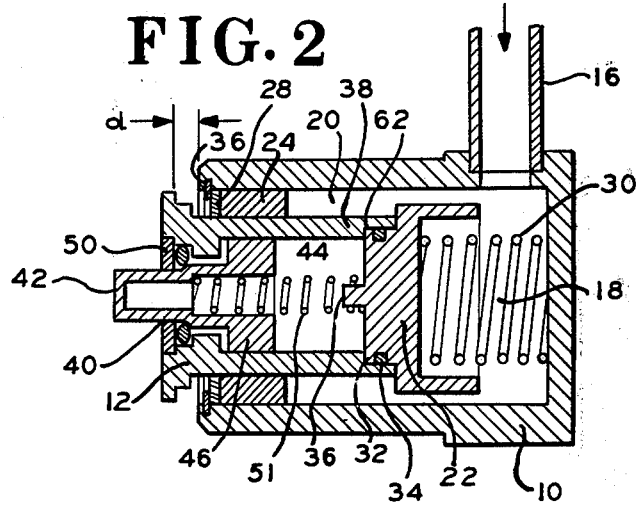
FIG. 2 is a cross-sectional view of the primary and secondary housings interrelated to form the outlet.

FIG. 2 shows the valve construction having the primary housing 12 inserted into operational position within the secondary housing 10. The numbers on FIG. 2 correspond to similar parts and features of FIG. 1. As can be seen in FIG. 2, the movable valve element 22 has been displaced from its seat 24 by the open end of cylindrical body 38, thus opening the secondary valve 20. As long as the primary housing 12 is held in this operational position, the secondary valve 20 will remain open. As can be easily seen, when the primary housing 12 is then removed from secondary housing 10, the secondary valve 20 will automatically close, thus preventing the leakage of gas from the interior chamber 18, thus allowing inspection and/or repair of the various parts of the primary housing 12.

As may also be seen from FIG. 2, the outside diameter of the cylindrical body 38 of primary housing 12 fits within and is sealed against the inside diameter of the valve seat 24 to prevent gas from leaking past the primary housing 12 to the external ambient when the primary housing 12 is operationally interfitted within secondary housing 10.

A primary valve 62 is formed when the primary housing 12 is interfitted, as shown, into secondary housing 10. The primary valve 62 comprises, as a movable element, the movable valve element 22 which seals by means of O-ring 34 against the inside diameter of the cylindrical body 38 of primary housing 12. Thus, as the primary housing 12 is interfitted into the secondary housing 10, the interreaction both opens the secondary valve 20 and forms the primary valve 62, the latter being held in the valve closed position by the force of spring 30 acting against movable valve element 22. In the interrelationship therefore, gas in the interior chamber 18 of secondary housing 10 is prevented from entering chamber 44 within primary housing 12, and thus the line pressure of such gas does not act upon the dust plug 42. The dust plug 42, is, in turn, held in the closed position as shown in FIG. 2, by the force of spring 51 acting against the spring keeper 36 of movable valve element 22 against the dust plug 42. In order to retain the dust plug 42 in the closed position, the spring constant of spring 51 must be less than that of spring 30.

As the primary housing 12 and secondary housing 10 are interfitted into the operative position, it should be noted that because of the sliding seal between the outside diameter of cylindrical body 38 of the primary housing 12 and the seat 24, the two housings can be adjusted with respect to each other, yet be fully operational. This sliding interrelationship allows for a plaster adjustment for different thicknesses of walls or plaster in the actual installation to insure that the eventual finished faceplate is flush with the wall. In FIG. 2, the distance "d" is shown which is so adjustable.

Figure 3:
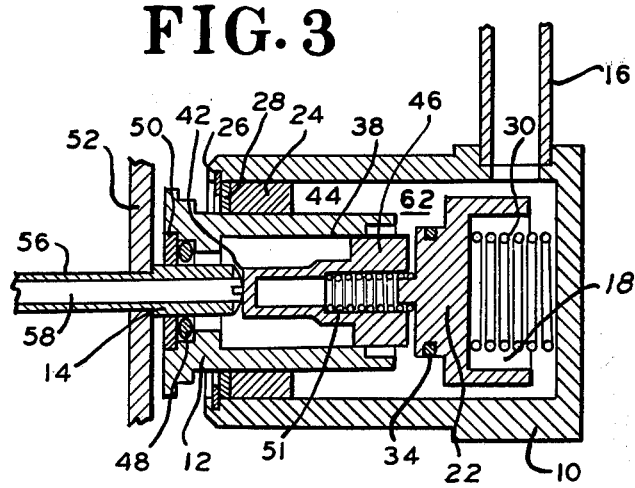
FIG. 3 is a cross-sectional view of the primary and secondary housings interrelated and having the adapter inserted into the outlet to open the primary valve.

FIG. 3 shows the valve construction having the adapter 14 inserted into the primary housing 12 and thus is in the operational position whereupon gas passes through the adapter 14 to its eventual use. The adapter 14 can be interlocked in known manner with the overall valve construction, such as by the locking arrangement shown and described in U.S. Pat. No. 3,563,267.

As shown in FIG. 3, the insertion of adapter 14 causes displacement of the dust plug 42 away from its sealing O-ring 48, however, at such initial time there is still no gas pressure with primary chamber 44 and thus no escape of gas to the ambient surroundings. As the adapter 14 is further inserted, the rearward surface of dust plug 42 engages valve element 22. At or slightly before such point of engagement, the adapter 14 has sufficiently entered the primary housing 12 such that its outer surface is sealed against the interior of primary housing 12 by means of O-ring 48. As adapter 14 further progresses, it forces the valve element 22 to the point where the primary valve 62 is opened, that is, the O-ring 34 of valve element 22 is moved away from its sealing position in the internal bore of cylindrical body 38.

The opening of the primary valve 62 allows the gas chamber 18 of the secondary housing 10 to enter the chamber 44 within primary housing 12 and then out of the valve construction through passageway 58 of the adapter 14.

It may thus be seen that until the primary valve 62 is opened, there is no gas pressure within the primary housing 12 and the initial displacement of dust plug 42 is therefore relatively easy. The adapter 14 is therefore insertable against only minor bias of spring 51 and the initial insertion allows easy alignment. It is only after the adapter 14 is inserted to a predetermined linear displacement that the primary valve 62 is opened. At this point, the force to insert the adapter 14 is increased since it must then overcome the force of line pressure on the dust plug area but the adapter 14 is sufficiently within the primary housing 12 at that time that further insertion to locking position is readily facilitated.

I claim:

1. A double valve construction comprising a secondary housing including an inlet adapted to be connected to a source of gas or vacuum, said secondary housing having a secondary valve including means biasing said secondary valve toward its closed position, said secondary valve having a movable valve element and a valve seat on said secondary housing, a primary housing having one end thereof adapted to be operably inserted into said secondary housing to axially move said secondary valve against said biasing means, said one end of said primary housing including seal means preventing said secondary valve from opening by the insertion of said primary housing into said secondary housing, a dust cap valve means including bias means biasing said dust cap valve means towards its closed position, said dust cap valve means normally closing the outlet on the other end of said primary housing, a primary valve formed between said one end of said primary housing and said secondary valve when said primary housing is interfitted into said secondary housing, said dust cap valve means adapted to receive an adapter means to first open said dust cap valve means a predetermined linear distance to then open said primary valve to permit communication of gas or vacuum between said primary and secondary housings and said outlet.

2. A double valve construction as defined in claim 1 wherein the interfitting of said primary housing into said secondary housing is linearly adjustable while retaining said secondary valve in the valve open position.

3. A double valve construction as defined in claim 1 wherein said valve seat is an annular, semi-flexible material fitted within the interior of said secondary housing.

4. A double valve construction as defined in claim 1 wherein a slidable seal is formed between said primary housing and said secondary housing.

5. A double valve construction as defined in claim 4 wherein said primary housing is a cylindrical body and said slidable seal is formed between the outside diameter of said cylindrical body and the inside diameter of said valve seat.

* * * * *